United States Patent [19]

Gruender, Jr. et al.

[11] Patent Number: 5,206,865
[45] Date of Patent: Apr. 27, 1993

[54] ERROR DETECTION AND CORRECTION MEMORY SYSTEM

[75] Inventors: Eugene H. Gruender, Jr.; Douglas R. Kraft, both of Austin, Tex.

[73] Assignee: Motorola, Inc., Schaumburg, Ill.

[21] Appl. No.: 628,502

[22] Filed: Dec. 17, 1990

[51] Int. Cl.⁵ .............................................. G06F 11/10
[52] U.S. Cl. .................................. 371/40.1; 371/40.1
[58] Field of Search ................... 371/40.1, 40.2, 40.3, 371/40.4, 37.2

[56] References Cited

U.S. PATENT DOCUMENTS 4,633,472 12/1986 Krol .................................... 371/40.1
4,775,978 10/1988 Hartness ........................... 371/40.1
5,056,095 10/1991 Horiguchi et al. ................. 371/40.1

*Primary Examiner*—Charles E. Atkinson
*Attorney, Agent, or Firm*—Walter W. Nielsen; Harold G. McGurk IV

[57] ABSTRACT

Two or more memory arrays are coupled to two or more error detection and correction (EDAC). Each memory array has a plurality of memory devices each having a plurality of outputs. The outputs of each memory are divided among the EDACs such that no more than two outputs from a single memory device are coupled to a single EDAC.

11 Claims, 4 Drawing Sheets

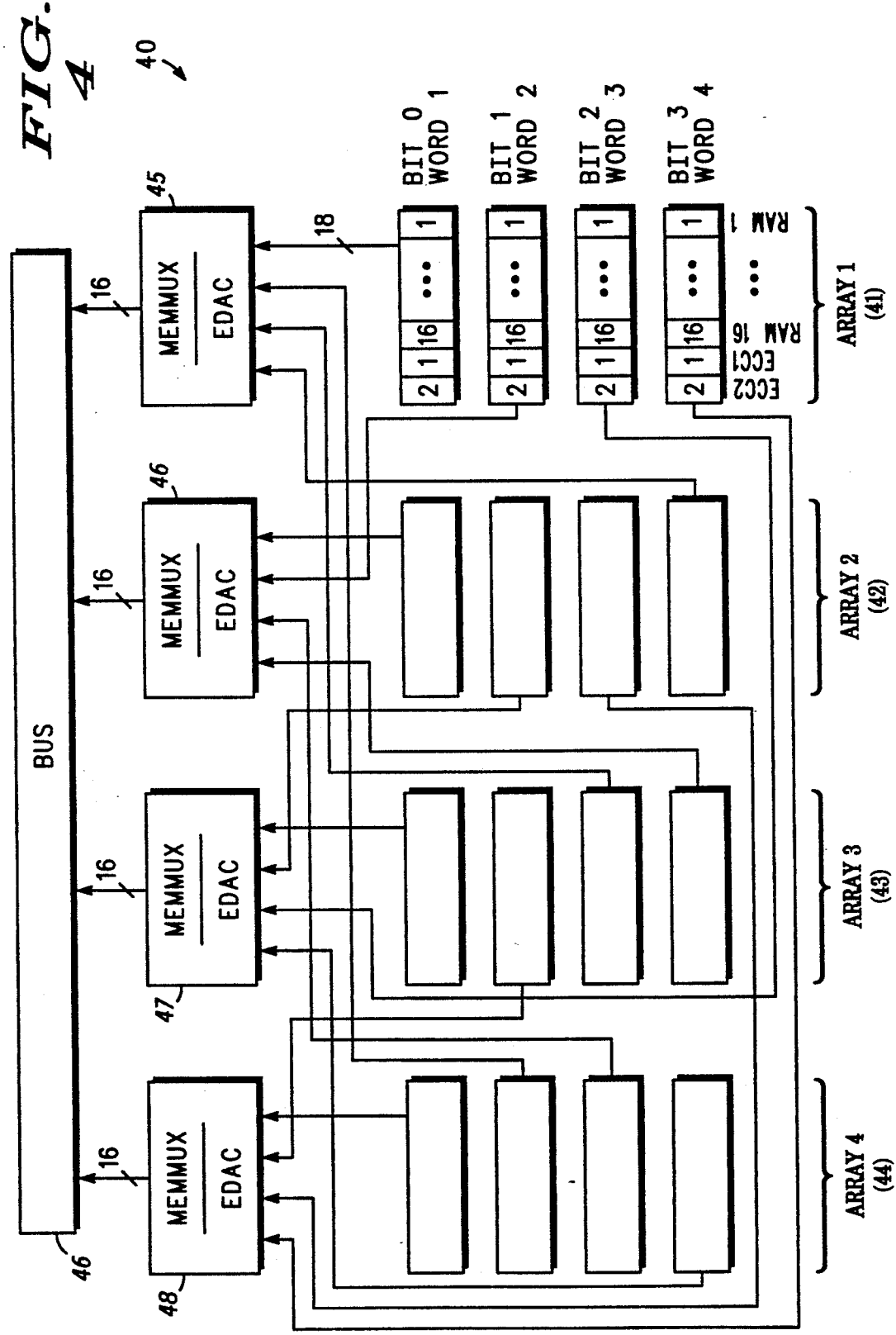

ERROR DETECTION AND CORRECTION MEMORY SYSTEM

BACKGROUND OF THE INVENTION

The present invention relates, in general, to error detection and correction and, more particularly, to error detection and correction using memory multiplexers (MEMMUXs).

Currently, memory is commonly arranged in a series of logical banks. In the present application, the memory referred to is generally a Random Access Memory (RAM) and is typically a Dynamic Random Access Memory (DRAM). Each memory device typically comprises a 4-bit output and is referred to as a 4× DRAM. For example, in a 32-bit system, a set of eight 4-bit DRAMs would be used. A 32-bit word would have the first four bits of the word stored in one DRAM; the next four bits in the next DRAM; and so on until the entire word was stored.

When the word is read from memory, it will often be loaded into an Error Detection And Correction (EDAC) (such as the MC74F2960 Error Detection and Correction Circuit of Motorola Inc.) device so that the integrity of the word can be determined before being transfered. To accomplish the error detection and correction of the data word, an error correction word is transfered with the data word to the EDAC. For a 32-bit word, the error correction word is a 7-bit word. In a 64-bit system, the error correction word would be an 8-bit word.

An EDAC is able to detect one and two bit errors and can correct one bit errors. The corrected word is then forwarded to the system.

However, a problem exists in the event one of the DRAMs goes bad. This would automatically cause 4-bits of the 32-bit word to be suspect. Since the EDAC can neither detect or correct a 4-bit error, this would pass through undetected.

SUMMARY OF THE INVENTION

A particular embodiment of the present invention comprises a plurality of memory arrays. Each array has a plurality of memory devices, each device having multiple outputs. A first portion of the outputs of a first array and a second portion of the outputs of a second array are coupled to a first error detection and correction device. A second portion of the outputs of the first array and a first portion of the outputs of the second array are coupled to a second error detection and correction device. The error detection and correction devices are coupled to multiplexers which are in turn coupled to a data bus.

In operation, a single data word is stored across the memory arrays along with its error correction word. When the data word is retrieved from memory, the data from the various arrays is transfered to the error detection and correction devices. If a single data word is not large enough to fill the EDACs, then other data words are transferred along with the requested data word. Along with the data words, the error correction words are transferred. The outputs from the individual memory devices is divided such that only a portion is transmitted to the first EDAC with the remainder going to other EDACs. The data word(s) are then checked and passed on to the data bus.

BRIEF DESCRIPTION OF THE DRAWINGS

FIG. 4 is a block diagram of the data flow for a second error detection and correction scheme embodying the present invention.

DETAILED DESCRIPTION OF THE DRAWINGS

Figure 1:
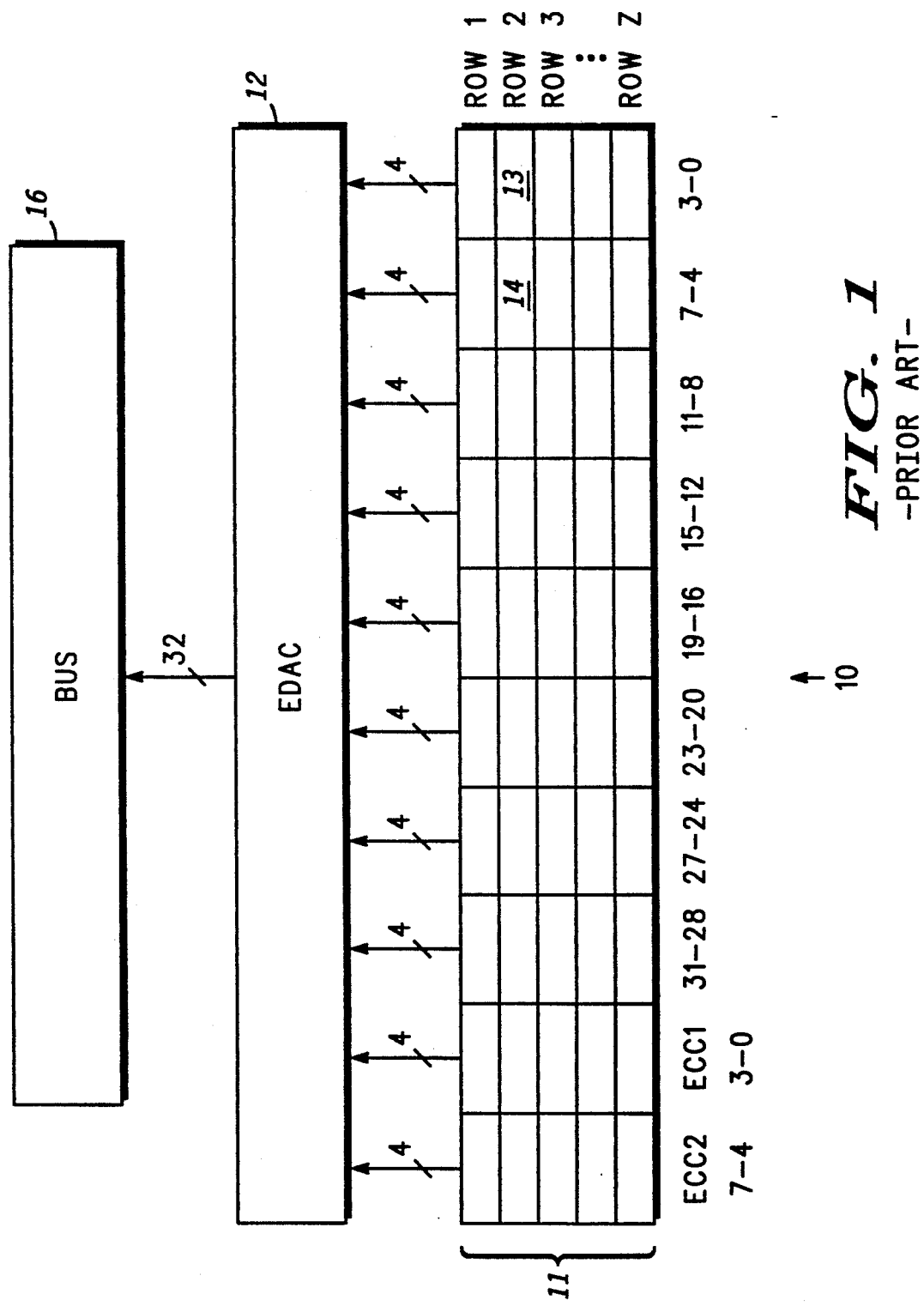
FIG. 1 is a block diagram of the data flow for a prior art error detection and correction scheme.

Referring to FIG. 1, a block diagram, generally designated 10, of a prior art error detection and correction scheme is illustrated. Diagram 10 consists of a plurality of memory devices 11 illustrated as being arranged in a matrix. Each column of memory is shown with a 4-bit output being coupled to an EDAC 12.

When a word is recalled from memory, an address is provided for the location of the word. As an example, we will take the address as being located in the memory of Row 2. The first four bits of the word (bits 0, 1, 2, and 3) will then be transferred by memory 13 to EDAC 12. Concurrently, bits 4, 5, 6, and 7 will be transfered from memory 14 to EDAC. This will continue for all 32-bits. In addition, a total of seven bits will be transferred from ECC 1 and ECC 2 to act as the error correction word for this data word. The corrected 32-bit data word is then passed to a bus 16.

As stated earlier, EDAC 12 is capable of detecting two bit errors and can correct a one bit error. However, if a memory device was to go bad, such as memory 14, then four bits (4–7) would be potentially bad and undetected by EDAC 12.

Figure 2:
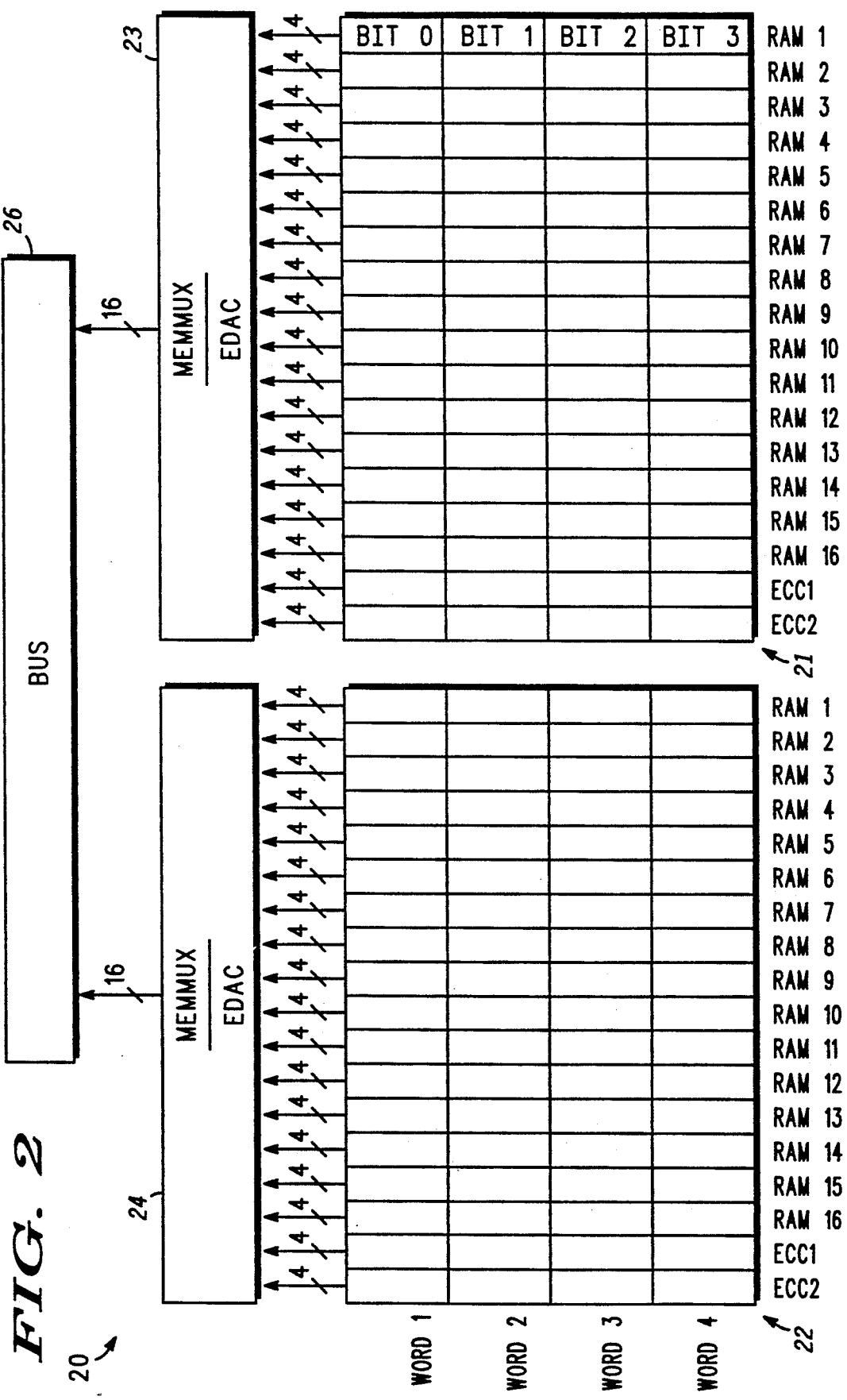
FIG. 2 is a block diagram of the data flow for an alternative error detection and correction scheme.

Another example of data flow in an error detection and correction scheme is illustrated FIG. 2 as block diagram 20. This example uses two sets of memory arrays 21 and 22. Each array consists of a set of 18 4× memories, 16 for the data word and two for the error correction and detection. Each of arrays 21 and 22 is coupled to a memory multiplexer 23 and 24, respectively.

As illustrated, each column of arrays 21 and 22 represents a memory device (RAM) and each row represent one of the outputs of the 4× RAM devices. In operation, when a data word is accessed, bits 0-3 of RAMs 1-16 are loaded into MEMMUX/EDACs 23 and 24. The bits loaded into MEMMUX 23 are the first half of the words and the bits loaded into MEMMUX 24 are the second half of the words. In loading 64 data bits at once, half of four different words are loaded into the MEMMUXs. The 64-bits are accompanied by 8-bit correction words.

The error detection and correction operation is then performed on the 64-bit data words. At this point, the first and second halves of the requested data word are forwarded to a bus 26. For example, if word 2 was requested, the corrected data originally from bit 1 of RAM arrays 21 and 22 is forwarded to bus 26. If all four words were requested, then all of the data would be transmitted in the order requested.

As is standard with EDACs, the above example could identify a two bit error; and identify and correct a one bit error. Again, because all four bits from a single RAM are transmitted concurrently to the EDAC, if a RAM was to go bad, then all four bits would be bad and the EDAC would fail to identify this error.

Figure 3:
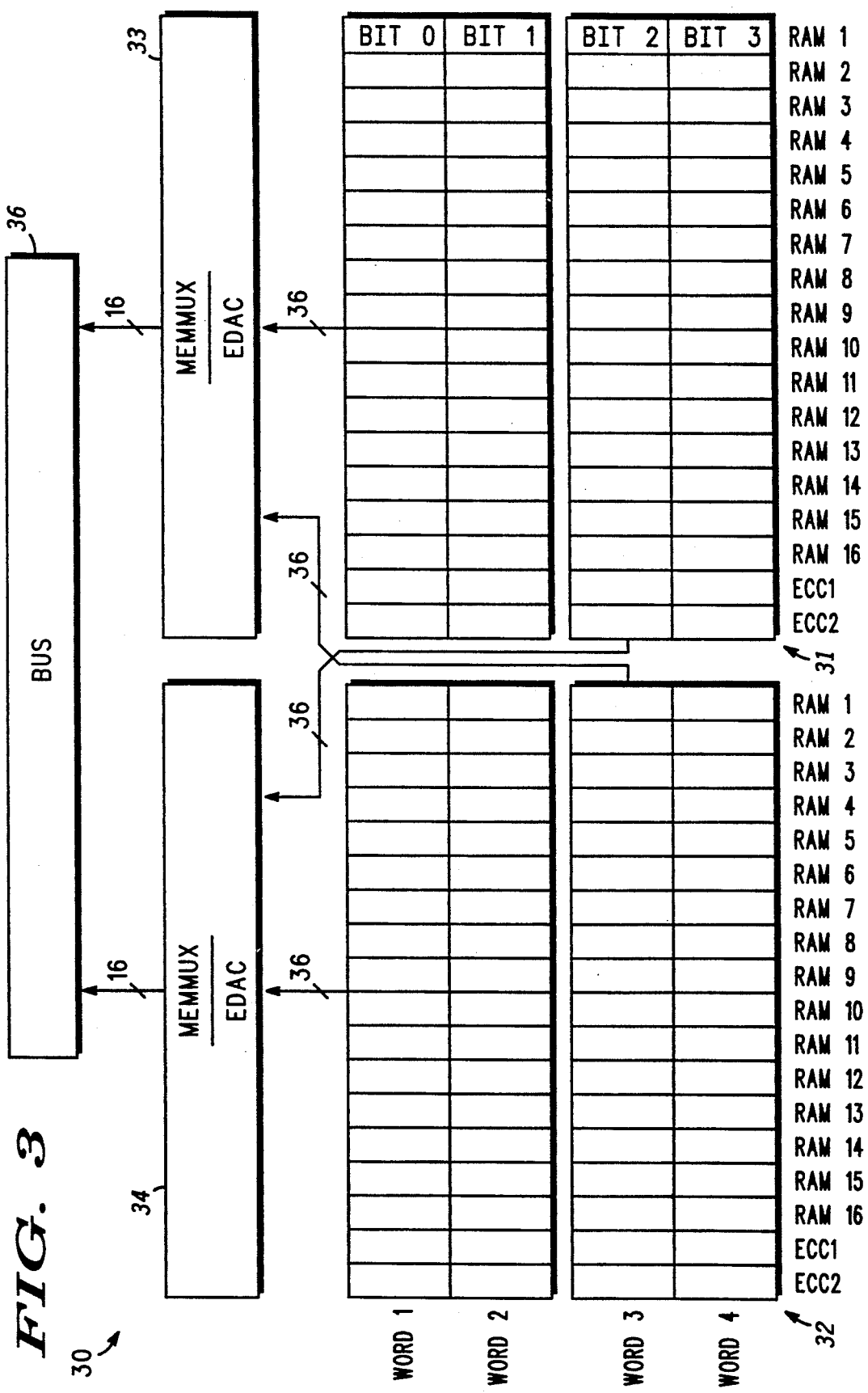
FIG. 3 is a block diagram of the data flow for an error detection and correction scheme embodying the present invention.

Referring now to FIG. 3, a block diagram, generally designated 30, of a data flow for an error detection and correction scheme embodying the present invention is illustrated. The components of this embodiment are the same as in the previous example of FIG. 2. However, in operation, the bits for the first half of words 3 and 4 are transmitted to MEMMUX/EDAC 34 and the bits for the second half of words 3 and 4 are transmitted to MEMMUX/EDAC 33.

In this instance, if an entire memory device was to be defective, then only two bits in each of the MEMMUX/EDACs would be in error allowing the EDACs to detect all four bits in error.

Once the data words are processed through the MEMMUX/EDACs, they are transmitted to bus 36. In this case, the reversal of the two portions of the word may be handled in one of two ways. First, when the data words are loaded into memory arrays 31 and 32, the data for the first and second halves of the words on bit pins 2 and 3 can be transposed. The second alternative is to arrange the bits properly as they are transmitted to the bus.

Because of the integrity of individual bits, it is more likely that an entire device will go bad (from a defect in the power or ground coupling) than for several bits in a single word. Therefore, it is important to be able to detect this type of memory error.

In FIG. 4, a block diagram, generally designated 40, of a data flow for a second error detection and correction scheme embodying the present is illustrated.

Diagram 40 consists of four memory arrays 41–44 and four MEMMUX/EDACs 45–48. As in FIG. 3, each MEMMUX receives a 64-bit data word and an 8-bit correction word. However, in this example, a 64-bit bus 46 is being used which requires four 16-bit MEMMUXs.

Each of arrays 41–44 has 18 4× memory devices (RAM1-16 and ECC1-2). The data loaded into bits 0–3 of the memories represents words 1–4, respectively. In this embodiment, each bit of the 4× memories is coupled to a different EDAC. Specifically, bits 0–3 of array 41 are coupled to the EDACs 45–48, respectively. A table of all of the connections is provided below.

| ARRAY | BIT | EDAC |
| --- | --- | --- |
| 1 | 0 | 45 |
| 1 | 1 | 46 |
| 1 | 2 | 47 |
| 1 | 3 | 48 |
| 2 | 0 | 46 |
| 2 | 1 | 47 |
| 2 | 2 | 48 |
| 2 | 3 | 45 |
| 3 | 0 | 47 |
| 3 | 1 | 48 |
| 3 | 2 | 45 |
| 3 | 3 | 46 |
| 4 | 0 | 48 |
| 4 | 1 | 45 |
| 4 | 2 | 46 |
| 4 | 3 | 47 |

As can be seen from the table, each bit of any one memory device is coupled to a different EDAC. This will enable the EDAC to detect errors caused by a bad memory device, as in the embodiment of FIG. 3, and to be able to correct the error since there is only one bit error per EDAC. This arrangement would permit the normal operation of a computer system even if an entire memory device was defective.

Therefore, as stated above, the present invention provides a method and apparatus for error detection and correction that can be arranged to either detect or detect and correct data errors caused by defective memory devices.

Thus, it will be apparent to one skilled in the art that there has been provided in accordance with the invention, a process and method that fully satisfy the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method of detecting errors in a memory system having first and second memory arrays, each memory array having a plurality of memory devices, said method comprising the steps of:
    storing a data word and a correction word in said memory devices, said data and correction words each having a first portion stored in said first memory array and a second portion stored in said second memory array;
    retrieving said data and correction words from said memory arrays;
    transmitting said data word from a first portion of each of said plurality of memory devices of said first array to a first error detecting and correcting means for detecting errors in said data word;
    transmitting said data word from a first portion of each of said plurality of memory devices of said second array to said first error detecting and correcting means; and
    transmitting said data word from a second portion of each of said plurality of memory devices of said second array to said second error detecting and correcting means; and
    checking said data word for an error.

2. The method of claim 1, further comprising the steps of:
    transmitting said correction word from a first portion of each of said plurality of memory devices of said first array to a first error detecting and correcting means for detecting errors in said correction word;
    transmitting said correction word from a second portion of each of said plurality of memory devices of said first array to a second error detecting and correcting means for detecting errors in said correction word;
    transmitting said correction word from a first portion of each of said plurality of memory devices of said second array to said first error detecting and correcting means; and
    transmitting said correction word from a second portion of each of said plurality of memory devices of said second array to said second error detecting and correcting means.

3. The method of claim 1, wherein said correction word is used to check said data word for said error.

4. A method of detecting and correcting errors in a memory system having first and second memory arrays, each memory array having a plurality of memory devices, said method comprising the steps of:

storing a data work and a correction word in said memory devices, said data and correction words each having a first portion stored in said first memory array and a second portion stored in said second memory array;

retrieving said data and correction words from said memory arrays;

transmitting said data word from a first portion of each of said plurality of memory devices of said first array to a first error detecting and correcting means for detecting errors in said data word;

transmitting said data word from a second portion of each of said plurality of memory devices of said first array to a second error detecting and correcting means for detecting errors in said data word, transmitting said data word from a first portion of each of said plurality of memory devices of said second array to said first error detecting and correcting means, and transmitting said data word from a second portion of each of said plurality of memory devices of said second array to said second error detecting and correcting means;

checking said data word for an error; and correcting said error if one is found in said data word.

5. The method of claim 4, further comprising the steps of:

transmitting said correction word from a first portion of each of said plurality of memory devices of said first array to a first error detecting and correcting means for detecting errors in said correction word;

transmitting said correction word from a second portion of each of said plurality of memory devices of said first array to a second error detecting and correcting means for detecting errors in said correction word;

transmitting said correction word from a first portion of each of said plurality of memory devices of said second array to said first error detecting and correcting means; and transmitting said correction word from a second portion of each of said plurality of memory devices of said second array to said second error detecting and correcting means.

6. The method of claim 4, wherein said correction word is used to check said data word for said error and to correct said data word if said error is detected.

7. A method of detecting errors in a memory system having first and second memory arrays, each memory array having a plurality of memory devices, each memory device having a plurality of outputs, each of said plurality of outputs being coupled to a plurality of memory cells, said method comprising the steps of:

storing a first portion of a first data word in said plurality of memory cells coupled to a first output of said plurality of outputs of said memory devices of said first memory array;

storing a second portion of said first data word in said plurality of memory cells coupled to a first output of said plurality of outputs of said memory devices of said second memory array;

storing a first portion of a second data word in said plurality of memory cells coupled to a second output of said plurality of outputs of said memory devices of said first memory array;

storing a second portion of said second data word in said plurality of memory cells coupled to a second output of said plurality of outputs of said memory devices of said second memory array;

storing a first portion of a first correction word in said plurality of memory cells coupled to a first output of said plurality of outputs of said memory devices of said first memory array;

storing a second portion of said first correction word in said plurality of memory cells coupled to a first output of said plurality of outputs of said memory devices of said second memory array;

storing a first portion of a second correction word in said plurality of memory cells coupled to a second output of said plurality of outputs of said memory devices of said first memory array;

storing a second portion of said second correction word in said plurality of memory cells coupled to a second output of said plurality of outputs of said memory devices of said second memory array;

retrieving said data and correction words from said memory arrays;

transmitting said first portions of said first data and correction words to a first error detecting and correcting means for detecting errors;

transmitting said second portions of said first data and correction words to a second error detecting and correcting means for detecting errors;

transmitting said first portions of said second data and correction words to said second error detecting and correcting means;

transmitting said second portions of said second data and correction words to said first error detecting and correcting means;

combining said first portion of said first correction word and said second portion of said second correction word in said first error detecting and correcting means to check a first combination word comprised of said first portion of said first data word and said second portion of said second data word;

combining said second portion of said first correction word and said first portion of said second correction word in said second error detecting and correcting means to check a second combination word comprised of said second portion of said first data word and said first portion of said second data word;

checking said first and second combination words for an error; and correcting said error if one is found in said first or second data words.

8. An error detection memory system comprising:

a first memory array having a plurality of memory devices, each of said plurality of memory devices having first and second outputs;

a second memory array having a plurality of memory devices, each of said plurality of memory devices having first and second outputs;

first error detecting and correcting means for detecting errors in a data word stored in said error detection memory system, said first error detecting and correcting means being coupled to said first outputs of said plurality of memory devices of said first memory array and to said second outputs of said plurality of memory devices of said second memory array; and second error detecting and correcting means for detecting errors in a data word stored in said error detection memory system, said second error detecting and correcting means being coupled to said second outputs of said plurality of memory devices of said first memory array and to said first outputs of said plurality of memory devices of said second memory array.

9. The error detection memory system of claim 8, further comprising:
first multiplexing means for multiplexing an output from said first error detecting and correcting means, said first multiplexing means having an input coupled to an output of said first error detecting and correcting means and an output;
second multiplexing means for multiplexing an output from said second error detecting and correcting means, said second multiplexing means having an input coupled to an output of said second error detecting and correcting means and an output; and
a bus coupled to said outputs of said first and second multiplexing means.

10. The error detection memory system of claim 8, further comprising:
a third memory array having a plurality of memory devices, each of said plurality of memory devices having a first output coupled to said first error detecting and correcting means, a second output coupled to said second error detecting and correcting means, a third output, and a fourth output;
a fourth memory array having a plurality of memory devices, each of said plurality of memory devices having a first output coupled to said first error detecting and correcting means, a second output coupled to said second error detecting and correcting means, a third output, and a fourth output;
third error detecting and correcting means for detecting errors in a data word stored in said error detection memory system, said third error detecting and correcting means being coupled to a third output of said plurality of memory devices of said first and second memory arrays and to said third outputs of said plurality of memory devices of said third and fourth memory arrays; and
fourth error detecting and correcting means for detecting errors in a data word stored in said error detection memory system, said fourth error detecting and correcting means being coupled to a fourth output of said plurality of memory devices of said first and second memory arrays and to said fourth outputs of said plurality of memory devices of said third and fourth memory arrays.

11. The error detection memory system of claim 10, further comprising:
first multiplexing means for multiplexing an output from said first error detecting and correcting means, said first multiplexing means having an input coupled to an output of said first error detecting and correcting means and an output;
second multiplexing means for multiplexing an output from said second error detecting and correcting means, said second multiplexing means having an input coupled to an output of said second error detecting and correcting means and an output;
third multiplexing means for multiplexing an output from said third error detecting and correcting means, said third multiplexing means having an input coupled to an output of said third error detecting and correcting means and an output;
fourth multiplexing means for multiplexing an output from said fourth error detecting and correcting means, said fourth multiplexing means having an input coupled to an output of said fourth error detecting and correcting means and an output; and
a bus coupled to said outputs of said first, second, third, and fourth multiplexing means.

* * * * *

UNITED STATES PATENT AND TRADEMARK OFFICE
CERTIFICATE OF CORRECTION

PATENT NO. : 5,206,865

DATED : April 27, 1993

INVENTOR(S) : Gruender, et al

It is certified that error appears in the above-identified patent and that said Letters Patent is hereby corrected as shown below:

Column 4, after line 34, insert the paragraph --transmitting said data word from a second portion of each of said plurality of memory devices of said first array to a second error detecting and correcting means for detecting errors in said data word;--.

Column 5, line 1, delete "work" and insert the word --word--.

Signed and Sealed this

Seventeenth Day of May, 1994

Attest:

BRUCE LEHMAN

*Attesting Officer*            *Commissioner of Patents and Trademarks*